United States Patent
Lewarchik et al.

(10) Patent No.: US 10,982,112 B2
(45) Date of Patent: Apr. 20, 2021

(54) HYDROPHOBIC SILICONE COATING

(71) Applicant: CHEMICAL DYNAMICS LLC, Plymouth, MI (US)

(72) Inventors: Ronald Lewarchik, Brighton, MI (US); Atman Fozdar, Ypsilanti, MI (US)

(73) Assignee: CHEMICAL DYNAMICS LLC, Plymouth, MI (US)

( * ) Notice: Subject to any disclaimer, the term of this patent is extended or adjusted under 35 U.S.C. 154(b) by 0 days.

(21) Appl. No.: 16/279,259

(22) Filed: Feb. 19, 2019

(65) Prior Publication Data

US 2019/0256738 A1 Aug. 22, 2019

Related U.S. Application Data

(60) Provisional application No. 62/632,710, filed on Feb. 20, 2018.

(51) Int. Cl.

| | | |
|---|---|---|
| *C09D 183/06* | (2006.01) | |
| *C08G 77/18* | (2006.01) | |
| *C09K 13/06* | (2006.01) | |
| *C09D 7/61* | (2018.01) | |
| *C08G 77/08* | (2006.01) | |
| *C08G 77/06* | (2006.01) | |
| *C09D 183/08* | (2006.01) | |
| *C08G 77/24* | (2006.01) | |
| *C09D 7/40* | (2018.01) | |
| *C09D 7/20* | (2018.01) | |

(52) U.S. Cl.
CPC ........... *C09D 183/06* (2013.01); *C08G 77/06* (2013.01); *C08G 77/08* (2013.01); *C08G 77/18* (2013.01); *C08G 77/24* (2013.01); *C09D 7/61* (2018.01); *C09D 183/08* (2013.01); *C09K 13/06* (2013.01); *C09D 7/20* (2018.01); *C09D 7/40* (2018.01)

(58) Field of Classification Search
CPC ...... C07F 7/1804; C09D 183/06; B01J 31/00; B01J 31/38
See application file for complete search history.

(56) References Cited

U.S. PATENT DOCUMENTS

| | | | | |
|---|---|---|---|---|
| 5,449,712 | A | * | 9/1995 | Gierke ................ C04B 41/4961 106/2 |
| 6,528,585 | B1 | * | 3/2003 | Standke ................ C08F 255/02 525/102 |
| 2006/0210727 | A1 | * | 9/2006 | Ibuki ....................... G02B 1/111 428/1.31 |

FOREIGN PATENT DOCUMENTS

JP 09 013017 * 1/1997

OTHER PUBLICATIONS

JP 09 013017 machine translation (1997).*

* cited by examiner

*Primary Examiner* — Kuo Liang Peng
(74) *Attorney, Agent, or Firm* — Blue Filament Law PLLC

(57) ABSTRACT

A hydrophobic silicone coating composition includes a trialkoxysilane with trialkoxy functionality, a polyfluorinated trialkoxysilane, and an organometallic cure catalyst. A coating on a substrate is provided that includes a cured film produced by the cure of the coating composition. The coating has a contact angle of at least 93 degrees after 500 hours of exposure to UV-A exposure in ASTM D 4329 QUV using UVA 340 bulbs, cycle B exposure of alternate cycles of UV exposure and condensing humidity all at elevated temperature.

14 Claims, 3 Drawing Sheets

FIG 1A, 1B, and 1C - Initial Contact angle before exposure to accelerated tests
FIG. 1A            FIG. 1B            FIG. 1C
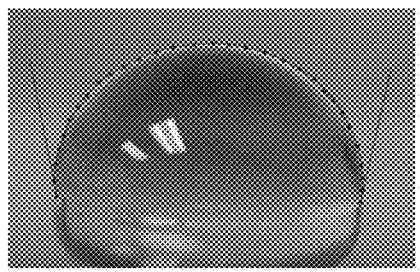 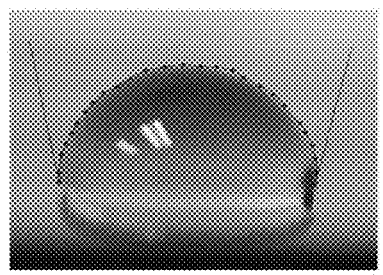 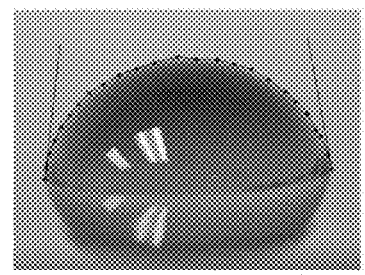
V3 Ceramic Coating
Contact angle – 103.8°
Competitor - 1
Contact angle – 101.86°
Competitor - 2
Contact angle – 81.61°
FIG 2A, 2B, and 2C - Contact angle after 500 hours salt spray ASTM B117
FIG. 2A            FIG. 2B            FIG. 2C
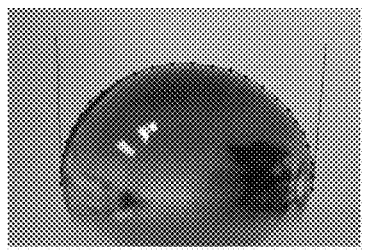 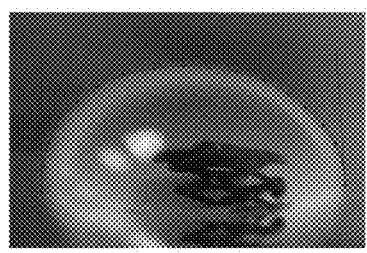 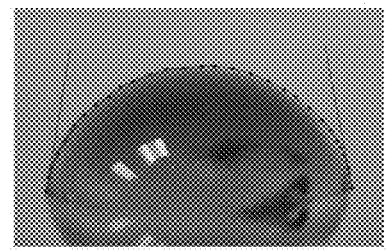
V3 Coating
Contact angle – 93.71°
Competitor - 1
Contact angle – 88.02°
Competitor - 2
Contact angle – 79.96°

FIG 3A, 3B, and 3C - Contact angle after 500 hours QUV-A exposure, ASTM D4329
FIG. 3A
FIG. 3B
FIG. 3C
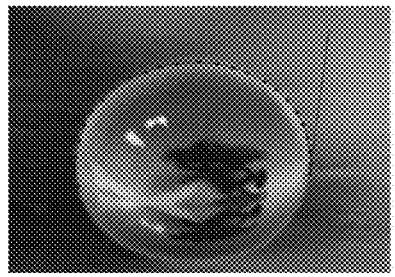
V3 Coating
Contact angle – 99.94°
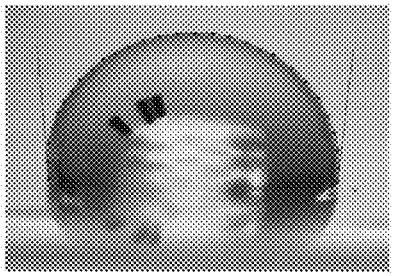
Competitor - 1
Contact angle – 96°
Competitor - 2
Contact angle – 78.16°
FIG 4A, 4B, 4C - Contact angle after 500 hours of QCT – Cleveland condensing humidity test
FIG. 4A
FIG. 4B
FIG. 4C
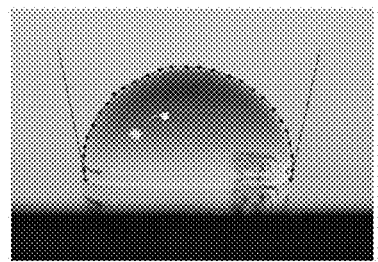
V3 Coating
Contact angle – 102.12°
Competitor - 1
Contact angle – 98.77°
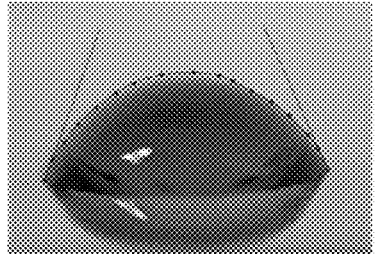
Competitor - 2
Contact angle – 64.31°

FIG 5A, 5B and, 5C - Contact angle after 500 hours Saltsoak immersion test – Modified ASTM D870
FIG. 5A                          FIG. 5B                          FIG. 5C
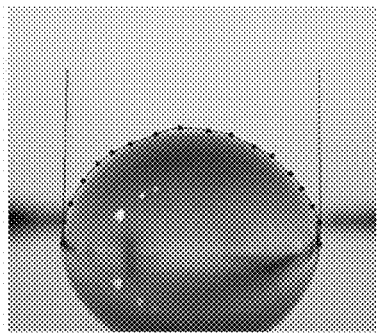
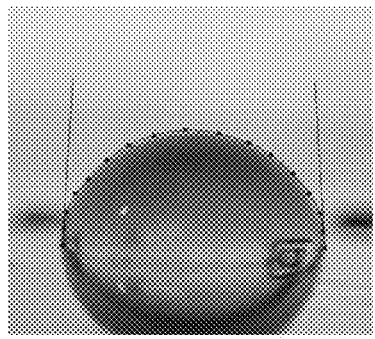
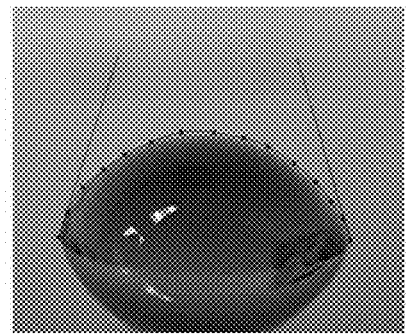
V3 Coating
Contact angle – 89.07°
Competitor - 1
Contact angle – 86.47°
Competitor - 2
Contact angle – 71.38°

HYDROPHOBIC SILICONE COATING

RELATED APPLICATIONS

This application claims priority benefit of U.S. Provisional Application Ser. No. 62/632,710 filed Feb. 20, 2018; the contents of which are hereby incorporated by reference.

FIELD OF THE INVENTION

The present invention relates to a reactive and highly durable hydrophobic silicone coating, for application on substrates including metal, plastic, and glass for various applications where water is required to be repelled. Processes for the production of such coatings and methods to make the surfaces hydrophobic using the coating are also disclosed.

BACKGROUND OF THE INVENTION

In industries inclusive of construction, automotive, aerospace, and marine appliances, surface coatings not only protecting surfaces from weathering, dirt collection, insect deposits, but also in enhancing aerodynamics and aesthetic appeal. Weathering of materials as disparate as polymeric resins, thermoplastics, metal, and glass results from exposure to ultraviolet light, windblown particulate, and water induced corrosion. These problems are further complicated for transparent substrates that become dirty and prone to glare and other optical phenomena that obscure vision through the transparent substrate. An understanding of the wettability of various materials is required to provide a successful protective coating, based on the physical and chemical heterogeneity of substrates, as well the effect of weathering on such a coating. For example, coatings inclusive of double bond unsaturations are prone to both ultraviolet light (UV) degradation and ozonolysis.

There are many products on the market that are used to coat a surface. However, these available water repellent coatings have certain disadvantages as discussed in the foregoing session.

Thus, there exists a need for an improved hydrophobic coating that alleviates problems of the prior art as mentioned above.

SUMMARY OF THE INVENTION

A hydrophobic silicone coating composition includes a trialkoxysilane with trialkoxy functionality, a polyfluorinated trialkoxysilane, and an organometallic cure catalyst. A coating on a substrate is provided that includes a cured film produced by the cure of the coating composition. The coating has a contact angle of at least 93 degrees after 500 hours of exposure to UV-A exposure in ASTM D 4329 QUV using UVA 340 bulbs, cycle B exposure of alternate cycles of UV exposure and condensing humidity all at elevated temperature.

BRIEF DESCRIPTION OF THE DRAWINGS

The foregoing summary, as well as the following detailed description of the invention will be better understood when read in conjunction with the appended drawings. For the purpose of assisting in the explanation of the invention, there are shown in the drawings embodiments which are presently preferred and considered illustrative. It should be understood, however, that the invention is not limited to the precise arrangements and instrumentalities shown therein. In the drawings:

FIGS. 1A, 1B, and 1C are annotated initial contact angle photographs for a water droplet on a coating of inventive formulation 14, competitor 1, and competitor 2, respectively before accelerated test exposure.

FIGS. 2A, 2B, and 2C are annotated contact angle photographs for a water droplet on a coating of inventive formulation 14, competitor 1, and competitor 2, respectively after 500 hours of salt spray exposure per ASTM B117.

FIGS. 3A, 3B, and 3C are annotated contact angle photographs for a water droplet on a coating of inventive formulation 14, competitor 1, and competitor 2, respectively after 500 hours of QUV-A exposure per ASTM D4329;

FIGS. 4A, 4B, and 4C are annotated contact angle photographs for a water droplet on a coating of inventive formulation 14, competitor 1, and competitor 2, respectively after 500 hours of QCT-Cleveland condensing humidity test exposure.

FIGS. 5A, 5B, and 5C are annotated contact angle photographs for a water droplet on a coating of inventive formulation 14, competitor 1, and competitor 2, respectively after 500 hours of salt soak immersion test per modified ASTM D870.

DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification are to be understood as being modified in all instances by the term "about". It is noted that, unless otherwise stated, all percentages given in this specification, and appended claims refer to percentages by weight of the total composition.

Thus, before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

It must be noted. that as used in this specification and the appended claims, the singular forms "a," "an" and "the" include plural referents unless the content clearly dictates otherwise. Thus, for example, reference to a "silane" may include two or more such silanes. Unless defined otherwise, all technical and scientific terms used herein have the same meaning as commonly understood by one of ordinary skill in the art to which the invention pertains.

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification are to be understood as being modified in all instances by the term "about". It is noted that, unless otherwise stated, all percentages given in this specification and appended claims refer to percentages by weight of the total composition.

Thus, before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

Definitions

The term "hydrophobic" as used herein refers to the property of being or making a extremely hydrophobic i.e., an extremely difficult to wet. The notion of using the contact angle made by a droplet of liquid on a surface of a solid substrate as a quantitative measure of the wetting ability of the particular solid has also long been well understood. Wetting is the ability of a liquid to maintain contact with a solid surface, resulting from intermolecular interactions when the two are brought together. The degree of wetting (wettability) is determined by a force balance between adhesive and cohesive forces. If the contact angle is greater than 90° for the water droplet to the substrate surface then it is usually considered to be hydrophobic. For example, there are materials on which liquid droplets have high contact angles, such as water on paraffin, for which there is a contact angle of about 107°. If the contact angle is less than or equal to 300 the water droplet readily spreads on the surface then it is considered to be hydrophilic.

As used herein, the term "contact angle" or "static contact angle" is referred to as the angle between a static drop of deionized water and a flat and horizontal surface upon which the droplet is placed. The contact is conventionally measured through the liquid, where a liquid/vapor interface meets a solid surface, and quantifies the wettability of a solid surface by a liquid. The higher the contact angle, the higher the hydrophobic interaction between the surface and the liquid. Sliding angle or roll-off angle is defined as the angle between the sample surface and the horizontal plane at which the liquid drop starts to slide off the sample surface under the influence of gravitational force. If a liquid spreads completely on the surface and forms a film, the contact angle is zero degrees (0°). As the contact angle increases, the wetting resistance increases, up to a theoretical maximum of 180°, where the liquid forms spherical drops on the surface. The term "wet-proof" is used to describe surfaces having a high wetting resistance to a particular reference liquid; "hydrophobic" is a term used to describe a wetting resistant surface where the reference liquid is water. The higher the contact angle, the higher the hydrophobic interaction between the surface and the liquid.

As used herein, the term "wetproof" and "hydrophobic" refers to a surface that generates a contact angle of greater than 90° with a reference liquid. As the wetting behavior depends in part upon the surface tension of the reference liquid, a given surface may have a different wetting resistance (and hence form a different contact angle) for different liquids.

As used herein, the term "substrate" is not construed to be limited to any shape or size, as it may be a layer of material, multiple layers or a block having at least one surface of which the wetting resistance is to be modified.

The terms "cured" and "curable" may be defined for the present specification by the cohesive bond strength of the surface material. In one embodiment described herein, curable is, any surface material having an unconfined compressive strength (UCS) bond strength of 10 psi or greater, such as from 10 psi to about 300 psi or more, such as from 10 psi to about 1200 psi.

For purposes of this application, the term "cured" and "crosslinked" are used interchangeably for the hardening which occurs in an organic material as described herein. However, the term "cured" also has a broader meaning in that it generally encompasses the hardening of any material, organic or inorganic, to form a stable material. For example, crosslinking, ionic bonding and/or removal of solvent to form a bonded material in its final hardened form may be considered curing.

As used herein, the term "coating" means a deposited layer applied to part or all of an exposed surface of a substrate.

Embodiments of the present invention provide a hydrophobic silicone coating composition that is a highly durable that is a transparent coating for glass, metal, and plastic, and automobile painted surfaces that is manually dispensable and may be easily applied to many substrates. Moreover, the inventive hydrophobic silicone coating is user friendly as the application of the coating takes place at room temperature, and can be applied by multiple ways that may include hand spray or applied with an applicator pad such as a microfiber pad soaked in the liquid hydrophobic silicone coating directly to the surface. Embodiments of the coating dry within 15-30 minutes, depending on film thickness and number of coats to provide a hydrophobic effect. However full cure can take as little as few hours to 48 hours as it is primarily dependent on relative humidity and temperature. Accordingly, low relative humidity and low temperatures require longer dry times. The coating is useful to repel water droplets, and improve aerodynamic drag and deicing properties in various applications such as aircraft wings and fuselage, wind turbines surfaces, house hold components, metal coated furniture, marine equipment parts, marine sports equipment like speed boat screens, automobile plastic components, automobile bodies and metal and nonmetallic components. In some inventive embodiments, the resulting cured inventive coating has a transparency of between 86 and 99.97% and in other embodiments between 98 and 99.91 and are visually transparent. These are readily measured using ASTM D1003: Standard Test Method For Haze and Luminous Transmittance of Transparent Plastics.

A hydrophobic silicone coating composition is provided that has exceptional durability as measured by a retention of high contact angle. The inventive coating composition upon cure forms a highly cross-linked silicone forming siloxane bonds that are resistant to UV scission. Contact angles of greater than 85 degrees are routinely obtained and maintained for a month or more of accelerated such as exposure to accelerated weathering in ASTM D5894 (QUV Weathering). An inventive coating composition includes a trialkoxysilane with trialkoxy functionality that cross links with itself as well as a polyfluorinated trialkoxysilane in the presence of an organometallic cure catalyst facilitating condensation cure. In addition, the silane groups can react with the surface of the substrate to create a Silicon-oxygen bond to the surface.

In certain inventive embodiments, the trialkoxysilane has a trialkoxy functionality between 80 and 100%. In still other embodiments, the trialkoxy functionality is 100%. A trialkoxysilane operative herein illustratively includes unsubstituted trialkoxysilanes such as tri-$C_{1-6}$-alkoxysilanes such as triethoxysilane and trimethoxysilane; examples of substituted trialkoxysilanes include alkyltri-$C_{1-6}$-alkoxysilanes; and aryltri-$C_{1-6}$-alkoxysilanes. Exemplary specific substituted trialkoxysilanes include methyltrimethoxysilane, ethyltrimethoxysilane, triisopropoxysilane, n-propyltrimethoxysilane, phenyltrimethoxysilane, methyltriethoxysilane, phenyltriethoxysilane, n-propyltriethoxysilane, trimethoxysilane, triethoxysilane, methacryloxypropyltrimethoxysilane, acryloxypropyltrimethoxysilane, n-phenyl-γ-γ-glycidoxypropyltrimethoxysilane, b-(3,4)-epoxycyclohexylethyltrimethoxysilane, and oligomers and copolymers of any of the aforementioned with the proviso that the average molecular weight thereof is less than 2000. The trialkoxysilane represents the majority of weight of the resulting coating and forming UV resistant siloxane bonds as the predominant cross linkage. It is appreciated that for ease of handling the trialkoxysilane is often dissolved in a carrier solvent, as is detailed hereafter. Regardless of whether a solvent carrier is present, the viscosity of the trialkoxysilane is between 50-750 Cp (Brookfield Spindle 3, 100 rpm).

In certain inventive embodiments, the polyfluorinated trialkoxysilane has a trialkoxy functionality between 80 and 100%. In still other embodiments, the trialkoxy functionality is 100%. A polyfluorinated trialkoxysilane operative herein illustratively includes tridecafluoro-1,1,2,2-tetrahydrooctyl trimethoxysilane, tridecafluorooctyl trimethoxysilane tridecafluorooctyl triethoxysilane, dodecafluoroheptyl propyl trimethoxysilane, heptadecafluorodecyl trimethoxysilane, heptadecafluorodecyl triethoxysilane or 4-methyl-(perfluoro hexyl ethyl) propyl trimethoxysilane, pentafluorophenoxyundecyl trimethoxysilane and oligomers and copolymers of any of the aforementioned with the proviso that the average molecular weight thereof is less than 2000. The polyfluorinated trialkoxysilane operates as a crosslinker in the resulting coating and forming UV resistant siloxane bonds with the trialkoxysilane and without intending to be bound to a particular theory imparts increasing hydrophobicity to the coating as the fluorine concentration in the film increases. It is appreciated that for ease of handling the polyfluorinated trialkoxysilane is often dissolved in a carrier solvent to form a miscible solution with the trialkoxysilane. Regardless of whether a solvent carrier is present, the viscosity of the polyfluorinated trialkoxysilane is between about 30 and 5000 Centipoise.

A cure catalyst operative herein illustratively includes organometallic catalyst compound containing tin or bismuth bond to an aliphatic carboxylic acid or alkoxy. Catalysts operative herein illustratively include those catalysts based on tin, titanium and or bismuth such as titanium IV butoxide, dibutyl tin dilaurate, bismuth neodecanoate, and combinations thereof. A cure catalyst is present in an amount of from 0.01 to 3% relative to the total weight of trialkoxysilane and polyfluorinated trialkoxysilane present in a composition.

A carrier is present in some embodiments of an inventive formulation and serves to modify viscosity, act as a diluent, promote mixing and ease of application. Carrier solvents operative herein illustratively include silicone oils such as those based on liquid methyl siloxanes such as dimethyl polydimethylsiloxane and polymethylphenylsiloxane, polydipropylsiloxane, polyphenylsiloxane, and other liquid silicone oils where the number average of the monomer units is between 1 and 200; as well as heterocyclics such as cyclomethicone, hexamethyldisiloxane, octamethyltrisiloxane, decamethylcyclopentasiloxane cyclopentasiloxane, octamethylcyclotetrasiloxane, or a combination thereof. Typical amounts of a carrier solvent in a formulation range from 0 to 90 total weight percent of a full formulated composition prior to cure.

Embodiments of the present invention provide a hydrophobic silicone coating composition may further include a surface additive. A surface additive used in the present invention illustrative is represented by the formula:

where $R^1$ denotes one to three groups each independently being an alkyl radical having one to eight carbon atoms, $R^2$ denotes a hydrolyzable radical chosen from the group consisting of alkoxides of one to three carbon atoms and chlorine atoms, and n is 1, 2 or 3 on average. Isobutyltrimethoxysilane is exemplary thereof. A surface additive is optional and if present is included at from 0.1 to 3 total weight percent of the amount of curable silanes and catalyst, and exclusive of the amount of carrier solvent.

In some inventive embodiments, the hydrophobic silicone coating composition includes organically modified nanoparticles of silica or titanium. Without intending to be bound to a particular theory, such particles increase coating scouring resistance and also function to increase the contact angle of the resulting coating. A organically modified nanoparticles is optional and if present, is included at from 0.1 to 10 total weight percent of the amount of curable silanes and catalyst, and exclusive of the amount of carrier solvent. The polydimethylsiloxy group represent an exemplary organic for modification to impart hydrophobicity to the resulting coating. The nano particles are dispersed in the curable silanes by conventional techniques including sonication. Particle size ranges from 10 nm to 500 nm.

An agent is used to react and/or displace water native in or on the substrate surface as well as to react with residual moisture contained in the liquid coating prior to application to improve stability. The surface water displacing agent can be a variety of different dehydrating agents that act to adsorb or absorb water or react with water such as ortho esters such as ethyl orthoformate, p-toluene sulfonyl isocyanate, molecular sieves and combinations thereof. The water scavenging or displacing agent is optional and if present, is included at from 0.1 to 5 total weight percent of the amount of curable silanes and catalyst, and exclusive of the amount of carrier solvent.

Inventive compositions are summarized in Table 1.

TABLE 1

Summary of the inventive fully formulated composition.

| Name | Typical Weight % | Preferred Weight % |
|---|---|---|
| Carrier Oil | remainder | remainder |
| Trialkoxysilane | 25-70 | 30-80 |
| Fluorinated trialkoxysilane | 1-12 | 2-8 |
| Orgnaometallic catalyst | 0.1-8 | 1-3 |
| Organic modified particulate | 0-10 | 1-3 |
| Surface additive | 0-10 | 1-3 |
| Ethyl Orthoformate | 0-10 | 0.1-5 |

Embodiments of the invention provide a process for the preparation of the hydrophobic silane coating composition:
preparing the trialkoxysilane and fluorinated trialkoxysilane solution by dissolving in carrier solvent under stirring (about 800 rpm, about 5 min)
adding a surface additive to the resin solution under stirring (about 800 rpm, about 5 minutes)

adding hydrophobic particles and remaining solvent in the same solution under ultra-sonication (amplitude about 20%, time: about 4 minutes) and adding remaining materials to the base solution and mix well for about 2 minutes Depending on the type and level of cure catalyst, the cure catalyst can be either added as a one component storage stable system or stored separately and admixed just prior to application to the target substrate surface. The fully formulated solution may be applied on a substrate by multiple methods including wiping or spray application methods. The coating is cured in the presence of moisture due to chemical cross linking of the silane groups with each other as well as the substrate surface to form siloxane linkages, and is adsorbed and absorbed firmly on the surface of the substrate to perform, as per the desired set properties of: generating higher contact angle and water repellency.

Coatings produced from an inventive compositions are summarized in Table 2.

TABLE 2

Summary of the coatings formed by inventive composition.
Presence of carrier oil.

| Name | Weight % |
| --- | --- |
| Fluorinated polyalkoxysiloxane | remainder |
| Orgnaometallic catalyst | 1-10 |
| Organic modified particulate | 1-3 |
| Surface additive | 1-3 |
| Etchant | 1-3 |

The coating is stable from −30° to 70° C. Curing time of the coating typically ranges from several minutes to several hours depending on relative humidity and temperature.

The present invention is further illustrated with respect to the following non-limiting examples in which percentages are by weight unless other noted:

Example 1

An inventive composition is provided and designated as V1 and includes 35% of D5 carrier oil, 55% of trimethoxysilane (Q20), 10% of isobutyltrimethoxysilane (20% in D5 Carrier Oil).

Example 2

An inventive composition is provided and designated as V2 and includes 35% of D5 carrier oil, 55% of trimethoxysilane (C50), and 10% of isobutyltrimethoxysilane (20% in D5 Carrier Oil).

Example 3

An inventive composition is provided and designated as V3 and includes 35% of D5 carrier oil, 55% of trimethoxysilane (Di-10), and 10% of isobutyltrimethoxysilane (20% in D5 Carrier Oil).

Example 4

An inventive composition is provided and designated as V4 and includes 29% of D5 carrier oil, 46% of trimethoxysilane (Q20), 16% of dibutyl tin dilaurate solution (10% in D5 Carrier Oil), and 8% of isobutyltrimethoxysilane (20% in D5 Carrier Oil).

Example 5

An inventive composition is provided and designated as V5 and includes 25% of D5 carrier oil, 39% of trimethoxysilane (Q20), 14% of dibutyl tin dilaurate solution (10% in D5 Carrier Oil), 14% of titanium IV butoxide solution (20% in D5 Carrier Oil), and 7% of isobutyltrimethoxysilane (20% in D5 Carrier Oil).

Example 6

An inventive composition is provided and designated as V8 and includes 25% of D5 carrier oil, 39% of trimethoxysilane (Q20), 14% of dibutyl tin dilaurate solution (10% in D5 Carrier Oil), 14% of titanium IV butoxide solution (20% in D5 Carrier Oil), and 7% tridecafluoro-1,1,2,2-tetrahydrooctyl trimethoxysilane (20% in D5 Carrier Oil).

Example 7

An inventive composition is provided and designated as V9 and includes 25% of D5 carrier oil, 39% of trimethoxysilane (C50), 14% of dibutyl tin dilaurate solution (10% in D5 Carrier Oil), 14% of titanium IV butoxide solution (20% in D5 Carrier Oil), and 7% tridecafluoro-1,1,2,2-tetrahydrooctyl trimethoxysilane (20% in D5 Carrier Oil).

Control

An inventive composition is provided and designated as V10 and includes 54% of D5 carrier oil, 39% of trimethoxysilane (C50), and 7% tridecafluoro-1,1,2,2-tetrahydrooctyl trimethoxysilane (20% in D5 Carrier Oil).

Example 8

An inventive composition is provided and designated as V11 and includes 46% of D5 carrier oil, 39% of trimethoxysilane (C50), 4% of dibutyl tin dilaurate solution (10% in D5 Carrier Oil), 4% of titanium IV butoxide solution (20% in D5 Carrier Oil), and 7% tridecafluoro-1,1,2,2-tetrahydrooctyl trimethoxysilane (20% in D5 Carrier Oil).

Example 9

An inventive composition is provided and designated as V12 and includes 46% of D5 carrier oil, 20% of trimethoxysilane (Q20), 20% of trimethoxysilane (C50), 4% of dibutyl tin dilaurate solution (10% in D5 Carrier Oil), 4% of titanium IV butoxide solution (20% in D5 Carrier Oil), and 7% tridecafluoro-1,1,2,2-tetrahydrooctyl trimethoxysilane (20% in D5 Carrier Oil).

Example 10

An inventive composition is provided and designated as V13 and includes 46% of D5 carrier oil, 39% of trimethoxysilane (C50), 4% of dibutyl tin dilaurate solution (10% in D5 Carrier Oil), 4% of titanium IV butoxide solution (20% in D5 Carrier Oil), and 7% tridecafluoro-1,1,2,2-tetrahydrooctyl trimethoxysilane (20% in D5 Carrier Oil).

Example 11

An inventive composition is provided and designated as V14 and includes 45% of D5 carrier oil, 38% of trimethoxysilane, 3% of dibutyl tin dilaurate solution (10% in D5 Carrier Oil), 3% of titanium IV butoxide solution (20% in D5 Carrier Oil), 7% tridecafluoro-1,1,2,2-tetrahydrooctyl trimethoxysilane (20% in D5 Carrier Oil), and 4% grams of ethyl orthoformate.

Example 12

An inventive composition is provided and designated as V15 and includes 44% of D5 carrier oil, 41% of trimethoxysilane, 7% of bismuth neodecanoate solution (10% in D5 Carrier Oil), 4% grams of titanium IV butoxide solution (20% in D5 Carrier Oil) 7% tridecafluoro-1,1,2,2-tetrahydrooctyl trimethoxysilane (20% in D5 Carrier Oil and 4% grams of ethyl orthoformate.

Example 13

The above compositions of Examples 1-12 along with competitor 1 and competitor 2 are cured and evaluated as detailed in Table 3 as to contact angle as a function of time and a UV exposure testing per ASTM G154.

TABLE 3

Contact angle for various samples before and after QUV-A exposure per ASTM D4329 and ASTM G154.

| Variations | Initial Contact angle | QUV-A ASTM D4329 | | | % Decrease in Contact angle after 21 days (500 hours) |
| --- | --- | --- | --- | --- | --- |
| | | After 7 days | After 14 days | After 21 days | |
| V1 | 90 | 49 | 38 | 33 | 63.33% |
| V2 | 90 | 56 | 41 | 37 | 58.89% |
| V3 | 90 | 53 | 44 | 41 | 54.44% |
| V4 | 90 | 48 | 43 | 36 | 60.00% |
| V5 | 90 | 51 | 48 | 39 | 56.67% |
| V8 | 93 | 90 | 59 | 35 | 62.37% |
| V9 | 95 | 93 | 90 | 90 | 5.26% |
| V10 | 90 | 85 | 80 | 80 | 11.11% |
| V11 | 92 | 90 | 87 | 85 | 7.61% |
| V12 | 88 | 86 | 83 | 83 | 5.68% |
| V13 | 90 | 86 | 86 | 84 | 6.67% |
| V14 | 104 | 102 | 101 | 100 | 3.85% |
| V15 | 80 | 79 | 76 | 71 | 11.25% |
| Competitor 1 | 102 | 99 | 97 | 96 | 5.88% |
| Competitor 2 | 82 | 80 | 78 | 78 | 4.88% |

The following notes are provided thereto
1. V1-5, V8 had an initial average contact angle of 90°.
2. V8 with trimethoxysilane instead of isobutyltrimethoxysilane showed greater contact angle and contact angle retention after 7 days of UV-A exposure. Shelf life - 2 weeks at room temperature.
3. V9 performed similar to V8 after 7 days of QUV-A exposure, gelled after 3-4 weeks at room temperature. After 21 days, decrease in contact angle was 5.26%.
4. V10 is control without catalyst. Took longer to dry and harden. Performance similar to V8 if tested after 4-5 days.
5. V11 with ¼ the amount of catalyst compared to V9. More stable.
6. V15 uses a tin-free catalyst.

Example 14

The composition of Example 11, V14 is evaluated against commercial competitive samples as detailed in FIG. 3 as to contact angle after 500 hours of UV-A exposure per ASTM D4329. Each material is applied to form a coating with a thickness of about 10 nm to about 2 microns onto Zinc phosphate cold rolled steel, coated with automotive refinish primer, basecoat and clear coat. In FIG. 1-5, V3 ceramic coating is a code for the formulation V14 of Example 11. Competitor 1 is CARPRO®, Competitor 2 is BRIGHTANIUM®. The decrease in contact angle after 500 hours of QUV-A exposure per ASTM D4329 for V3 coating (V14) is 3.85% compared to 5.88% and 4.88% of competitor samples respectively.

Example 15

The composition of Example 11, V14 is evaluated against commercial competitive samples as detailed in FIG. 4 as to contact angle after 500 hours of QCT—Cleveland condensing humidity test (Resistance to controlled condensation) per ASTM D4585. Each material is applied to form a coating with a thickness of about 10 nm to about 2 microns onto Zinc phosphate cold rolled steel, coated with automotive refinish primer, basecoat and clear coat. In FIG. 4, V3 ceramic coating is a commercial code for the formulation V14 of Example 11. Competitor 1 is CARPRO®, Competitor 2 is BRIGHTANIUM®. The decrease in contact angle after 500 hours for V3 coating (V14) is 1.62% compared to 3.03% and 21.2% of competitor samples respectively as measured by ASTM D4585 (Resistance to controlled condensation) at 120 degrees F.

Example 16

The composition of Example 11, V14 is evaluated against commercial competitive samples as detailed in FIG. 5 as to contact angle after 500 hours of salt immersion test per ASTM D870. Each material is applied to form a coating with a thickness of about 10 nm to about 2 microns onto Zinc phosphate cold rolled steel, coated with automotive refinish primer, basecoat and clear coat. In FIG. 5, V3 ceramic coating is a commercial code for the formulation V14 of Example 11. Competitor 1 is CARPRO®, Competitor 2 is BRIGHTANIUM®. The decrease in contact angle after 500 hours for V3 coating (V14) is 14.36% compared to 15.23% and 12.95% of competitor samples respectively as measured by ASTM D870 at 120 degrees F.

Example 17

The composition of Example 11, V14 is evaluated against commercial competitive samples as detailed in FIG. 2 as to contact angle after 500 hours of salt spray test per ASTM B117. Each material is applied to form a coating with a thickness of about 10 nm to about 2 microns onto Zinc phosphate cold rolled steel, coated with automotive refinish primer, basecoat and clear coat. In FIG. 2, V3 ceramic coating is a commercial code for the formulation V14 of Example 11. Competitor 1 is CARPRO®, Competitor 2 is BRIGHTANIUM®. The decrease in contact angle after 500 hours for V3 coating (V14) is 9.89% compared to 13.71% and 2.49% of competitor samples respectively as measured by ASTM B117. However, V3 coating (V14) maintains hydrophobicity while competitor samples lose their hydrophobicity after 500 hours of salt spray exposure.

Any patents or publications mentioned in this specification are herein incorporated by reference to the same extent as if each individual publication was specifically and individually indicated to be incorporated by reference.

The foregoing description is illustrative of particular embodiments of the invention, but is not meant to be a limitation upon the practice thereof. The following claims, including all equivalents thereof, are intended to define the scope of the invention.

The invention claimed is:
1. A hydrophobic silicone coating composition comprising:

a trialkoxysilane with trialkoxy functionality, said trialkoxysilane present from 25 to 70 weight % of the total composition;

a polyfluorinated trialkoxysilane; and an organometallic cure catalyst containing tin, titanium, bismuth, or a combination thereof.

2. The hydrophobic silicone coating composition of claim 1 wherein said trialkoxysilane has a viscosity of between 50-750 cps (Brookfield Spindle 3, 100 rpm).

3. The hydrophobic silicone coating composition of claim 1 wherein said polyfluorinated trialkoxysilane comprises tridecafluoro-1,1,2,2-tetrahydrooctyl trimethoxysilane, tridecafluorooctyl trimethoxysilane, tridecafluorooctyl triethoxysilane, dodecafluoroheptyl propyl trimethoxysilane, heptadecafluorodecyl trimethoxysilane, heptadecafluorodecyl triethoxysilane or 4-methyl-(perfluoro hexyl ethyl) propyl trimethoxysilane, pentafluorophenoxyundecyl trimethoxysilane and oligomers and copolymers of any of the aforementioned.

4. The hydrophobic silicone coating composition of claim 1 further comprising in which said trialkoxysilane with trialkoxy functionality, said polyfluorinated trialkoxysilane, and said organometallic cure catalyst are dissolved in a solvent.

5. The hydrophobic silicone coating composition of claim 4 wherein said solvent comprises a silicone oil.

6. The hydrophobic silicone coating composition of claim 4 wherein said solvent is hexamethyldisiloxane, octamethyltrisiloxane, decamethylcyclopentasiloxane, decahydrogencyclopentasiloxane, octamethylcyclotetrasiloxane, or a combination thereof.

7. The hydrophobic silicone coating composition of claim 1 further comprising organically modified nanoparticles of silica, organically modified nanoparticles of titanium, or a combination thereof.

8. The hydrophobic silicone coating composition of claim 1 further comprising a surface additive.

9. The hydrophobic silicone coating composition of claim 1 wherein said trialkoxysilane with trialkoxy functionality is present in an amount of 5 to 90 total weight percent.

10. The hydrophobic silicone coating composition of claim 1 further comprising an etchant.

11. The hydrophobic silicone coating composition of claim 10 wherein said etchant comprises sulfuric acid, phosphoric acid, chlorosilane, or a combination thereof.

12. The hydrophobic silicone coating composition of claim 1 wherein said trialkoxysilane is a trimethoxysilane.

13. The hydrophobic silicone coating composition of claim 1 wherein said polyfluorinated trialkoxysilane is a polyfluorinated trimethoxysilane.

14. A coating on a substrate comprising a cured film produced by the cure of claim 1 and having a contact angle of at least 93 degrees after 500 hours of exposure to UV-A exposure in ASTM D 4329 QUV using UVA 340 bulbs, cycle B exposure of alternate cycles of UV exposure, condensing humidity all at elevated temperature.

* * * * *